(No Model.)
T. P. NAVIN.
RIDING ATTACHMENT FOR HARROWS.
No. 511,025. Patented Dec. 19, 1893.
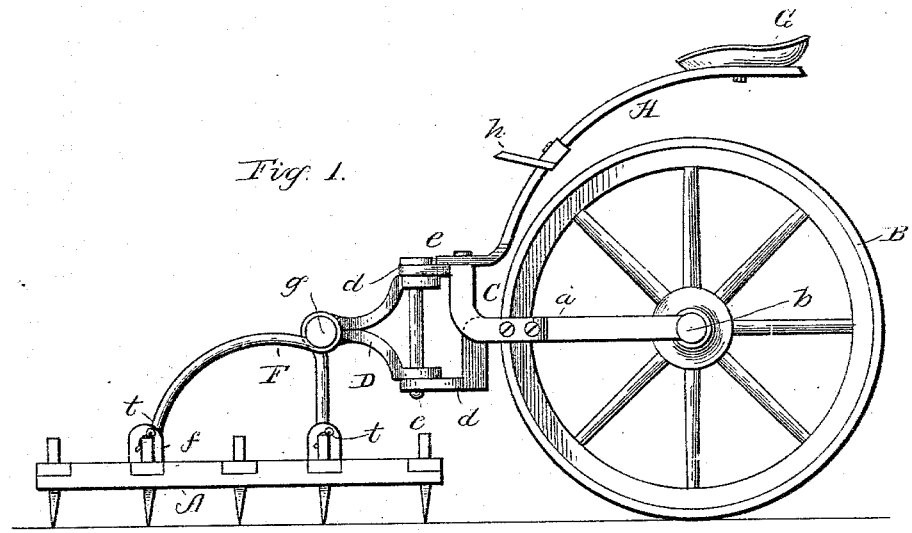
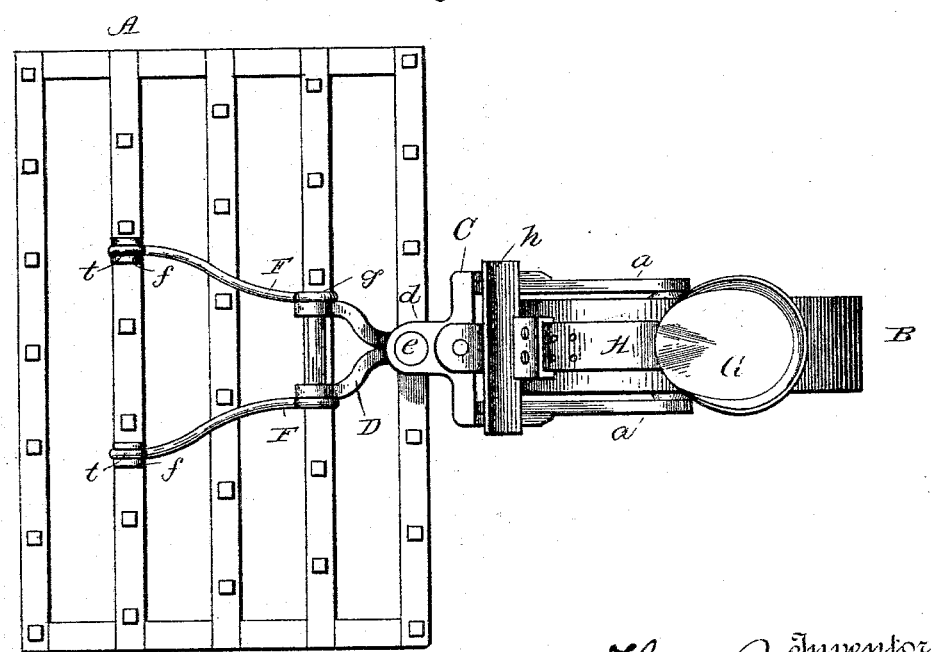
Witnesses
Victor J. Evans.
W. R. Berry
Inventor
Thos. P. Navin,
by Holcomb & Johnston
Attorneys

UNITED STATES PATENT OFFICE.

THOMAS P. NAVIN, OF STOVER, SOUTH DAKOTA.

RIDING ATTACHMENT FOR HARROWS.

SPECIFICATION forming part of Letters Patent No. 511,025, dated December 19, 1893.

Application filed July 15, 1893. Serial No. 480,644. (No model.)

*To all whom it may concern:*

Be it known that I, THOMAS P. NAVIN, a citizen of the United States, residing at Stover, in the county of Davison and State of South Dakota, have invented certain new and useful Improvements in Riding Attachments for Harrows; and I do hereby declare the following to be a full, clear, and exact description of the invention, such as will enable others skilled in the art to which it appertains to make and use the same.

My invention relates to riding attachments for harrows and consists in certain details of construction and arrangement of parts hereinafter more particularly described in the specification, illustrated in the drawings and pointed out in the claims. Its object is to provide a simple device of light and cheap construction to be so attached to an ordinary harrow as not to interfere with its effective operation, while at the same time a carriage is provided for the driver, enabling him to ride while operating the harrow in the usual manner.

In the drawings—Figure 1, is a side elevation showing my device and its method of attachment. Fig. 2, is a plan view.

Referring more specifically to the drawings by letter—A represents an ordinary harrow.

B is a wheel of suitable or convenient size so attached to the harrow by a main frame with pivotal connections as to follow the harrow, while not interfering with its free movement in conformity with the surface of the ground over which it passes. This frame is composed of a minor rectangular frame, C, which occupies a vertical position directly in front of the wheel and has projecting rearward from the center of its sides, arms $a$, the outer or rear ends of which are perforated to receive the axle $b$, upon which the wheel B turns. From the center of the top and bottom, or upper and lower sides of the frame C, project forwardly short arms $d$; also perforated at their outer ends to receive a pivot bolt $e$, on which is hung a yoke or swivel connection D. This yoke is designed to connect the frame C with the harrow, and is preferably composed of a single rod of iron bent into the form of a double Y with eyes, or openings, at its extremities, and is so formed that a bolt passed through the eyes or openings at one end occupies a horizontal position, while that in the opposite end occupies a vertical one. In order to connect the yoke D with the harrow, I provide upstanding angular legs F, composed of iron rods having their ends or feet turned to form eyes, and having an eye also formed at the bend or angle near the center. To receive the feet, I provide perforated ears $f$, secured to intermediate beams of the harrow in pairs at suitable distances apart, those on the forward beam being farther apart than those in the rear. The legs F are secured to the harrow by bolts passing through the ears and feet, and the legs when thus secured occupy positions side by side, the eyes at the angle being at a suitable distance apart to admit the forward end of the yoke D between them as shown in Fig. 2. The bolt $g$ is then passed through said eyes and those of the yoke and serves to form a pivotal connection between the two, whereby the harrow is capable of vertical motion in front or rear, and the pivot pin $e$ connecting the opposite end of the yoke with the frame C, as shown in Fig. 1, allows a lateral motion to the harrow, or, in other words, permits it to turn or swing toward either side with relation to the wheel and its frame.

G is the seat over the wheel mounted on a spring bar H secured at its foot to the upper side of the frame C, and an adjustable foot rest $h$ is provided upon the spring bar. It will be observed that by means of this pivotal connection the wheel will follow the harrow without in the least interfering with its free vertical or lateral movement, while at the same time it affords a firm, convenient and easy carriage for the driver.

Having thus described my invention, what I claim, and desire to secure by Letters Patent, is—

1. In combination with a harrow, a riding attachment consisting of the upwardly bent legs secured to the intermediate beams of the harrow, a frame provided with a wheel and seat, and a yoke connecting with the wheel frame by a vertical pivot bolt and to the upwardly bent legs of the harrow by a horizontal pivot bolt, substantially as and for the purpose described.

2. In a riding attachment for harrows, the upwardly bent legs adapted to be secured to the intermediate beams of the harrow and provided with eyes at their bends or angles, the wheel frame provided with the wheel and seat, and the double Y shaped yoke connected to the wheel frame by a vertical pivot bolt and to the fixed harrow legs, by a horizontal pivot bolt, all combined and arranged substantially as and for the purpose described.

3. In a riding attachment for harrows, the combination with the harrow of the perforated ears f secured to intermediate beams of the harrow, the upstanding legs F secured to the ears, the frame C carrying the wheel and seat, the Y shaped yoke D, the vertical pivot bolt e connecting the frame C and yoke and the horizontal pivot bolt g connecting the yoke and legs F, substantially as and for the purpose described.

In testimony whereof I affix my signature in presence of two witnesses.

THOMAS P. NAVIN.

Witnesses:
D. A. MIZERRES,
E. E. WAGNER.